Aug. 20, 1957  E. B. MURDOCK ET AL  2,803,059
SPOON
Filed June 6, 1956

INVENTOR.
Elen B. Murdock,
BY Eleanor Knupfer,

Wilkinson, Huxley, Byron + Hume
Attys

2,803,059

SPOON

Elen B. Murdock and Eleanor M. Knupfer, Glenview, Ill.

Application June 6, 1956, Serial No. 589,742

1 Claim. (Cl. 30—324)

The present invention relates to a spoon and more particularly to a feeding device which is adapted to administer certain types of nourishment to infants or invalids.

Due to the fact that many babies take their milk or formula from a nursing bottle, they are ordinarily unfamiliar with a spoon which is used after a certain period of growth and development. However, babies are ordinarily familiar with the conventional rubber nipple and receive it quite readily. The natural tendency of an infant getting hold of a rubber nipple is to place it in his mouth and suck. The present invention proposes to take advantage of this natural tendency. Another important factor in feeding babies is consideration for the gums which are quite tender and which are easily injured by biting or contacting hard objects.

It is therefore an object of the present invention to take advantage of the familiarity with rubber nipples in a feeding device for infants.

It is a further object of the invention to provide a baby spoon that is made of soft material that will not injure the baby's gums.

It is a still further object of the invention to provide a spoon which may be used for feeding invalids, such as for administering medicine and small amounts of liquids.

It is another object of the invention to provide a device for feeding infants which is conveniently and inexpensively manufactured.

Further objects and advantages of this invention will become evident as the description proceeds and from an examination of the accompanying drawing which illustrates one embodiment of the invention and in which similar numerals refer to similar parts throughout the several views.

Figure 1:
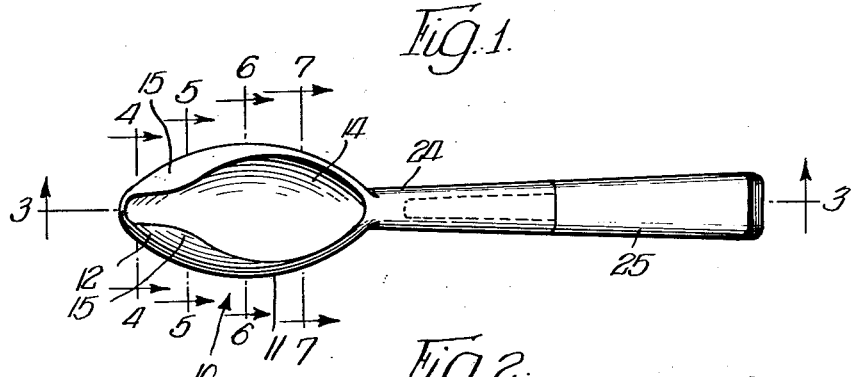
Fig. 1 is a top plan view of a device embodying the invention.
Figure 2:
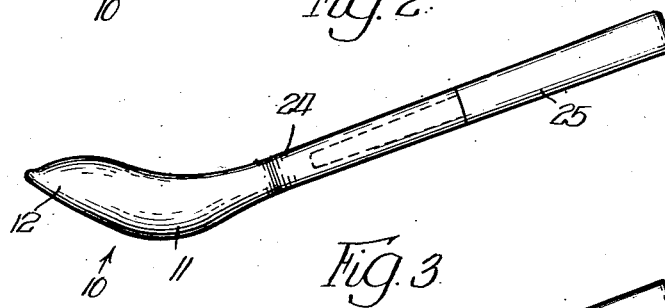
Fig. 2 is a side view in elevation of the device shown in Fig. 1.
Figure 3:
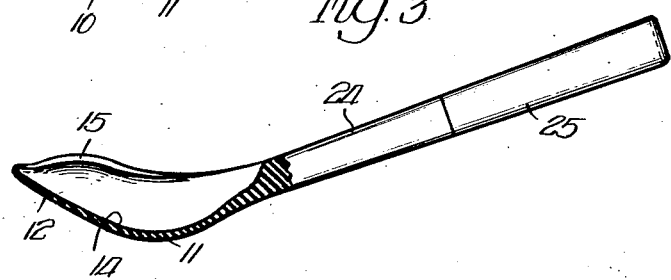
Fig. 3 is a view of the device shown in Fig. 1 with one side of the bowl broken away to disclose the interior of the bowl.
Figure 4:
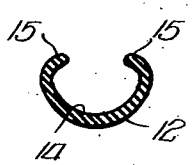
Fig. 4 is a view in section taken substantially along line 4—4 of Fig. 1.
Figure 5:
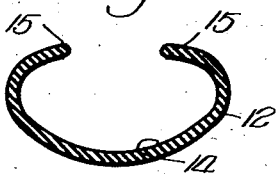
Fig. 5 is a view in section taken substantially along line 5—5 of Fig. 1.
Figure 6:
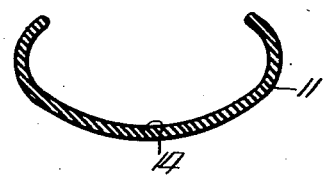
Fig. 6 is a view in section taken substantially along line 6—6 of Fig. 1.
Figure 7:
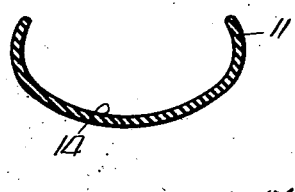
Fig. 7 is a view in section taken substantially along line 7—7 of Fig. 1.

Referring now to the drawings, the reference numeral 10 indicates a bowl in a baby spoon. The bowl 10 has a generally oval-shaped body 11, a lip portion 12 and a socket portion 24. The lip portion is adapted to be inserted in the mouth of an infant and may be of less width than the widest dimension of the body 11.

The bowl is formed with a concave recess or depression 14 to hold food. The depression narrows in the tip portion of bowl so as to provide a small passageway which communicates with the widest portion of the recess.

At the sides of the bowl are a pair of inwardly extending lips 15 which are curved and folded over the depression 14. The lips are shaped so as to overhang the top of the bowl member to form a small channel through which the infant can suck the food and also prevent accidental discharge of food if the bowl is rotated a small distance.

The bowl, socket and lips are formed integrally of tasteless, non-toxic rubber of suitable softness and flexibility to prevent unnecessary irritation of teething gums of the infant as he bites down on the spoon; but the socket from its rear end up to its point of juncture with the bowl will be of thicker, more rigid rubber, suitable to receive a readily removable handle 25. The thicker less flexible socket portion 24 will facilitate the application and removal of the handle when it is desired to sterilize the spoon. At the same time the bowl with its lips will have free flexibility for feeding purposes. The lip portion of the bowl is made of slightly softer and more flexible rubber than the center of the bowl to facilitate passage of food and to prevent irritation to teething gums.

The removable handle may be manufactured of any suitable material such as wood, plastic, metal, etc., and fashioned to fit into the socket of the spoon tightly enough to prevent rotating in the socket, or slipping out too easily. The handles should be made uniformly, and may accompany several bowl units in a package. The handle is designed for removal for economical reasons, as it is less expensive to replace the bowl portions which may soften with repeated sterilizing than to replace a complete unit. Also, the handle may be removed from the bowl for cleaning and sterilizing purposes.

From the foregoing the operation of the device will be apparent. The bowl of the spoon is filled with food which is to be fed to the infant. The tip portion is placed at the infant's mouth. The natural tendency of a baby is to suck this tip portion, and as it does so, the food is fed through the channel into the mouth.

The device of the present invention may be used for feeding invalids. Food or medicine can be given without any difficulty, and if necessary while the invalid is lying down.

In the drawing and specification there has been set forth a preferred embodiment of the invention, and although specific terms are employed, these are used in a generic and descriptive sense only, and not for purposes of limitation. Changes in form and the proportion of parts, as well as the substitution of equivalents are contemplated, as circumstances may suggest or render expedient, without departing from the spirit or scope of this invention as further defined in the following claim.

We claim:

An integrally formed feeding spoon comprising a soft, resilient, flexible bowl portion terminating in a narrow tip portion, flexible soft, resilient lip portions extending inwardly from the upper edges of the tip portion and adjacent bowl portion to form a relatively small channel narrowing to the tip portion through which food can be sucked, and a rigid handle portion at the rear of the bowl portion.

References Cited in the file of this patent

UNITED STATES PATENTS

| | | |
|---|---|---|
| 1,614,270 | Zifferer | Jan. 11, 1927 |
| 1,618,189 | Hansen | Feb. 22, 1927 |
| 2,166,013 | McLindon | July 11, 1939 |
| 2,338,980 | Stratton | Jan. 11, 1944 |
| 2,640,263 | Dieterich | June 2, 1953 |